United States Patent Office 3,236,487
Patented Feb. 22, 1966

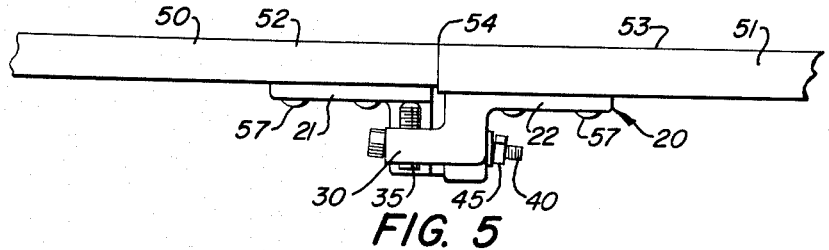
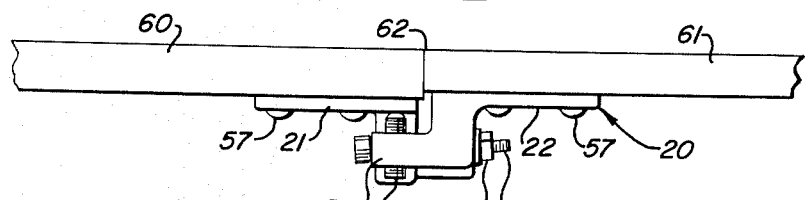
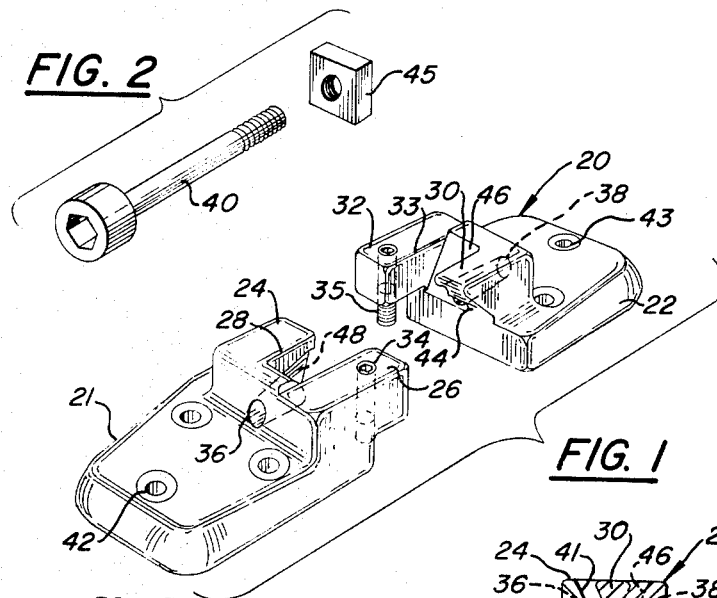
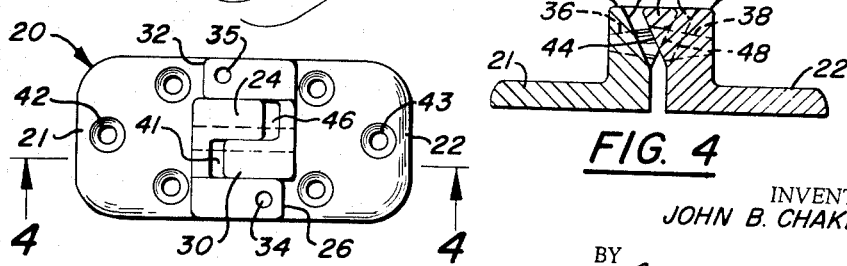

3,236,487
ADJUSTABLE CLAMP
John B. Chakeres, 5920 Olentangy Blvd.,
Worthington, Ohio
Filed July 29, 1963, Ser. No. 298,230
6 Claims. (Cl. 248—244)

This invention relates to clamps for joining together two objects and adjusting the position of the objects relative to one another.

One of the objects of this invention is to provide a clamp adapted to join two separate objects or surfaces together to form a common surface between the objects connected having a flush and tight joint therebetween.

Another object of the invention is to provide a clamp of the character described capable of joining adjacent members together, which: provides an adjustment for the respective surfaces of such members compensating for differences in thickness or variations in height so as to obtain an alignment of a common surface between the members in any desired position, and which positively locks the surfaces to prevent relative movement thereof after the proper adjustment has been secured.

It is also an object to provide an adjustable clamp of the type described which can be ruggedly and economically constructed with a minimum of parts, which is simple and easy to adjust, close or open, without requiring the use of special tools, and which provides for aligning adjacent members in any desired position regardless of their size or thickness so as to provide a tight joined and continuous flush surface therebetween or a surface at a predetermined height with respect to the adjacent member if preferred.

An additional object is to provide an adjustable clamp capable of connecting together a plurality of tables or benches, for example, so as to provide a substantially continuous and flush upper surface therebetween even where the tables or benches have top surfaces thereon varying in thickness with respect to each other, and which provides smoothly curved and streamlined contours free of obstructed areas which tend to collect dirt and dust particles and thus can be kept in a clean and sanitary condition with a minimum of time and effort.

Another object is to provide means for varying the position of one object, for example a table, with respect to another to provide a predetermined and permanent adjustment therebetween relative to a common surface comprising clamping portions adapted to engage in a cooperative relation and raise or lower one of the objects with respect to the other until the desired adjustment is obtained.

It is still another object of the present invention to provide a clamp of the type described wherein two adjoining clamp members comprise interlocking projections and arms that effect precise lateral alignment of the objects being clamped together and which, at the same time, provide means for precisely vertically adjusting the two objects relative to one another.

In the drawings:

FIG. 1 is a perspective view showing a clamp constructed to embody one form of the present invention, the connecting bolt being removed and shown at the side thereof;

FIG. 2 illustrates the bolt used in connecting the clamp members of FIG. 1;

FIG. 3 is a top elevational view of the clamp of FIG. 1;

FIG. 4 is a side sectional view of the clamp of the preceding figures, the section taken along the line 4—4 of FIG. 3;

FIG. 5 is a side elevation showing the clamp positioned as to connect two members of varying thicknesses with respect to each other so as to provide a flush surface therebetween; and FIG. 6 is a view similar to FIG. 5 also showing adjacent members of varying thicknesses being similarly connected but in reversed positions from those shown in FIG. 5.

Referring further to the drawings, in FIG. 1 is shown a clamp 20 for adjusting together two objects in a predetermined aligned position with respect to a common surface therebetween, or each other. This clamp comprises in general a pair of complementary and mutually adjustable clamping members or bases 21 and 22 which are constructed of metal, plastic or other suitable material. Clamp member 21 is provided with an alignment projection 24 and an arm 26 that form an open ended slot 28. Similarly, the other clamping member 22 includes an alignment projection 30 and an arm 32 that form an open ended slot 33.

As is best seen in FIGS. 1 and 3, the two clamping members 21 and 22 are provided with aligned apertures 36 and 38 through which is extended the bolt 40 of FIG. 3.

The inner end of slot 28 includes an inclined surface 41 that is spaced from a similarly inclined surface 44 on alignment projection 30 and in identical manner the inclined surface 46 of open ended slot 33 is disposed in spaced confronting relationship with a similarly inclined surface 48 on alignment projection 24 of clamp member 21.

It should be pointed out that the two clamp members are maintained laterally aligned by the positioning of the alignment projections 24 and 30 in their respective grooves 33 and 28 and with the confronting side surfaces of the projections and arms being closely fitted, as seen in FIG. 3, so as to prevent lateral movement of the clamp members relative to each other.

The installation and operation of the clamp 20 will be readily apparent from reference to FIGS. 5 and 6. In FIG. 5, for example, the clamp 20 is attached to the underside of adjacent tables. The table tops 50 and 51 are of different thickness with respect to each other as seen, the top 50, for example, being substantially thicker than top 51. To raise top 51 so that the upper surfaces 52, 53 of each table are flush and tightly joined, as at the common edge 54, so as to present a smooth continuous upper surface over both tables, the clamp 20 is separated as shown in FIG. 1 and clamping member 21, for example, is attached to the underside of table top 50 by means of screws or bolts 57 inserted through holes 42. Similarly clamping member 22 is then attached to the underside of table top 51. It is then only necessary to adjust the screws 34 and 35 until the table top 51 is raised sufficiently for its upper surface 53 to align and form a continuous flush surface with the upper surface 52 of table top 50. After this adjustment has been made bolt 40 which had been inserted through the apertures formed in the shoulders of the adjacent clamping members and lightly drawn together until the desired adjustment has been made, thereupon bolt 40 is tightened by means of nut 45 until the clamping members are drawn together sufficiently to form a tight joint, as at the common edge 54 between the table tops. It will be readily apparent that by providing a tapered aperture through the shoulders the bolt 40 thus has sufficient clearance within which to move to compensate for the relative vertical displacement between the two members.

In FIG. 6, the clamp 20 is also illustrated as being attached to the underside of adjacent tables. The table tops 60 and 61 are of different thickness in this instance also as illustrated, top 60 in this case being substantially less thick than top 61. However, the alignment of the table tops to form a substantially continuous and flush upper surface therebetween as well as a tight joint as at 62, is accomplished in the same manner as previously described. That is, the screws 34 and 35 are adjusted until the desired position is obtained with respect to the tops 60 and 61. The locking bolt 40 is then tightened to form a tight joint between the aligned surfaces.

It will also be readily apparent that if, for example, it is desired to raise and hold the upper surface of one object with respect to that of another, and to clamp the objects in that position, that such can be accomplished with the clamp 20 by adjusting the pins 34 and 35 until the desired relative displacement is obtained and then locking the clamp in that position.

It is to be noted, particularly as shown in FIG. 1 that the members and arms of the clamp are integrally formed with the clamping members and all are provided with smoothly rounded and curved corners and surfaces. They thus present in general a pleasing streamlined appearance, as well as surfaces relatively free of obstructed areas tending to gather or collect dirt and dust. Thus the clamp in general is easily and quickly cleaned and kept in a sanitary condition with a minimum of time and effort. Such features are highly desirable where the clamp is to be used, for example, in aligning tables in restaurants and public eating places.

From the above description it will be apparent that there is provided an adjustable clamp for clamping or locking together two adjacent objects and adjusting or aligning the surfaces therebetween to any desired position regardless of variations in thickness existing between the objects, the flush tight joint obtained being securely held with a positive locking action.

Due to the close fitting relationship between the alignment projections and arms lateral alignment of the two clamps, and hence the two objetcs being joined, is positively established and maintained.

I claim:

1. An adjustable clamp for connecting and aligning two objects, such as table tops, in end to end abutting relationship, comprising two clamp members, said members each having a base, each of said clamp members including an alignment projection spaced inwardly from an edge of its respective base and an arm extending along an opposite edge of said respective base, said alignment projection and arm being laterally spaced from one another to form an open ended slot, the alignment projection of each clamp member extending into the slot of the other clamp member, the arm of each clamp member extending over the base of the other clamp member in spaced relationship therewith to provide positive locking means against lateral movement, each of said arms having an adjustable pin extending from the arm and engaging the base over which the respective arm projects; and a bolt connecting said clamp members for drawing said clamp members towards one another.

2. The adjustable clamp defined in claim 1 wherein the alignment projection of each of said clamp members includes an inclined end surface that confronts an inclined bottom surface in the respective open ended slot into which it extends.

3. An adjustable clamp for connecting and aligning two objects, such as table tops, in end to end abutting relationship, comprising two clamp members, said members each having a base, each of said clamp members including an alignment projection spaced inwardly from an edge of its respective base and an arm extending along an opposite edge of said respective base, said alignment projection and arm being laterally spaced from one another to form an open ended slot, the alignment projection of each clamp member extending into the slot of the other clamp member, the arm of each clamp member extending over the base of the other clamp member in spaced relationship therewith to provide positive locking means against lateral movement, each of said arms having an adjustable pin extending from the arm and engaging the base over which the respective arm projects; and a bolt disposed between said arms for drawing said clamp members together.

4. The adjustable clamp defined in claim 3 wherein the alignment projection of each of said clamp members includes an inclined end surface that confronts an inclined bottom surface in the respective open ended slot into which it extends.

5. An adjustable clamp for connecting and aligning two objects, such as table tops, in end to end abutting relationship, comprising two clamp members, said members each having a base, each of said clamp members including an aperture, an alignment projection spaced inwardly from an edge of its respective base, and an arm extending along an opposite edge of said respective base, said alignment projection and arm being laterally spaced from one another to form an open ended slot, the alignment projection of each clamp member extending into the slot of the other clamp member, the arm of each clamp member extending under the base of the other base member in spaced relationship therewith to provide positive locking means against lateral movement, each of said arms having an adjustable pin extending from the arm and engaging the base under which the respective arm projects; and a bolt extending through the apertures for drawing the clamp members towards one another.

6. The adjustable clamp defined in claim 5 wherein the alignment projection of each of said clamp members includes an inclined end surface that confronts an inclined bottom surface in the respective open ended slot into which it extends.

References Cited by the Examiner
UNITED STATES PATENTS

| | | | |
|---|---|---|---|
| 1,006,974 | 10/1911 | Moore | 254—104 |
| 2,291,014 | 7/1942 | Woody | 189—36 |
| 2,565,065 | 8/1951 | Chakeres | 20—92 |

CLAUDE A. LE ROY, *Primary Examiner*,

FRANK L. ABBOTT, *Examiner*,